Fig. 2

INVENTOR.
Fred B. Graham

Fig. 3

INVENTOR.
Fred B. Graham.

INVENTOR.
Fred B. Graham

May 28, 1963 F. B. GRAHAM 3,091,188
TRANSFER SYSTEM

Filed Oct. 14, 1960 7 Sheets-Sheet 6

Fig. 7

INVENTOR.
Fred B. Graham
BY
Attorneys

United States Patent Office 3,091,188
Patented May 28, 1963

3,091,188
TRANSFER SYSTEM
Fred B. Graham, 70 Upland Road, Kentfield, Calif.
Filed Oct. 14, 1960, Ser. No. 62,718
12 Claims. (Cl. 104—29)

This invention relates to transfer systems and more particularly to systems for use in the transfer of large containers such as truck-trailer containers from one transportation medium to another.

In freight transportation, as in other industries, a matter of primary concern is the productivity and the economy of the system. In this respect, a particular problem has been in the transfer of freight from one transportation medium to another, such as between truck, rail, and ship, or between a transportation medium and a warehouse. Many solutions have been proposed and adopted. Among these are overhead trolleys suitable for picking up a quantity of freight from one mode of transportation, such as a truck, and delivering it by way of the trolley system to another mode of transportation, such as freight car or steamship. Such a system is shown in a patent to Marcus Waterman, No. 966,275, issued August 2, 1910.

Another solution to the freight transfer problem was early found by George Titcomb as evidenced by his Patent No. 1,107,378, issued on August 18, 1914. In the Titcomb system a hatched overhead operating floor is employed. The operating floor is located above a warehouse storage floor and above railroad tracks. Small traveling trucks are employed on the operating floor and serve to lift freight through one of the hatches, transfer the freight to another hatched area, and lower it therethrough. The system of Titcomb, however, is a "straight line system" wherein the traveling trucks leave and return to an original position along the same path. Still another solution has been the development of the fork lift wherein a large quantity of freight may be placed upon a pallet and moved about thereon.

Recently, a fundamental development has occurred in the transportation field. This is the advent of "container" transportation, wherein what formerly had been a truck-trailer is separated into a container portion and a wheel suspension portion. The container portion is releasable from the wheel portion and serves as an individual super-sized container. The container itself may be packed by a local manufacturer and carried by means of a truck to a railroad or shipping center. Even with the increasingly widespread knowledge and acceptance of container transport systems, however, the use of said systems has been channeled along lines long since established with more primitive transfer concepts.

In the usual process, large containers are transferred from the truck bed to flat bar bed by means of a large overhead traveling crane or trolley. The overhead crane is limited in its efficiency and productivity, and a single overhead crane can service only one railroad flat car and one truck at any given time. Consequently, for rapid fright loading or unloading operations, a large number of cranes is required. Even a large number of cranes may not be adequate, since in using more than one such crane, a considerable traffic problem develops due to the number of trucks, each attempting to be under a particular crane and alongside a given flat car.

In realization of the expense and the impracticability of the overhead crane, other systems have been devised. One such system employs a railroad flat car having a pivot on its top. The truck-tractor is utilized to push the container onto the flat car until the container is centrally located with respect to the pivot. The container is then relased from the tractor and from its suspended wheels, rotated and aligned with the flat car. Here again is the limiting requirement of relatively few containers being handled at one time due to the large amount of space required for maneuvering the truck and placing the container onto the flat car.

The development of these various systems for the movement of containers by rail and their commercial success of the last few years indicate a very rapid growth in this form of freight transportation. But the present systems, which were designed for the isolated handling of containers in a singular fashion have no capability for capitalizing on the great volumes of traffic that will pass through future container terminals.

It is, therefore, a general object of this invention to provide an improved transfer system.

It is a more particular object of this invention to provide a transfer system which is capable of high volumes of traffic.

It is still another object of this invention to provide a transfer system having the aforementioned characteristics wherein a large number of containers may be transferred from one medium to another simultaneously.

It is still a further object of this invention to provide a transfer system wherein containers are transferred from one medium to another by overhead means capable of unidirectional movement about a path or paths between the various mediums.

In order to fulfill the above mentioned purposes and objectives the present invention employs parking on terminal areas for the various modes of transportation to be serviced. The parking areas are arranged such that through traffic is possible at all times and that the presence of any number of individual vehicles will not hamper the free movement of other vehicles in that same area. A trestle network is provided above these terminal areas and those portions of the network above each terminal area are connected by short transfer-ways. Like the terminal areas the trestle network is arranged to provide for through traffic. The trestle is provided, at least in those portions above the parking areas for the individual transport media, with an open floor through which containers may be lifted and lowered. Independent transfer vehicles are deposited on the trestle network and serve not only to lift and lower the containers through the open floor but to deliver them to other locations in many alternate loop type continuous paths. Thus traffic on the trestle is in one direction providing minimum interference from other similar vehicles.

Desirable considerations for a system in accordance with this invention include one or more, or all of the following: There should be a multiple series of traffic loops for the transfer vehicles themselves on the trestle network wherein the transfer vehicles may move about the trestle network freely with minimum interference with other like vehicles. The multiple loop objective is made practical by the use of many alternate paths in those portions of the trestle network where the transfer operations take place. The intersections for the transfer vehicles should be at relatively slight angles wherein vehicular steering is not over complicated due to the open nature of the trestle network itself. There should be minimum use of crossing intersections so that the flow of movement of a particular vehicle is not limited by the general traffic flow of the overall system. Moreover, transfer-ways connecting the various portions of the trestle networks should be relatively short so as to minimize travel time for the transfer vehicle between the separate areas.

The more detailed description of the invention which follows will serve to further clarify the system and its operation. Upon review of the following description in conjunction with accompanying drawing other objects and features will become more clearly apparent. In the drawing.

Figure 1:
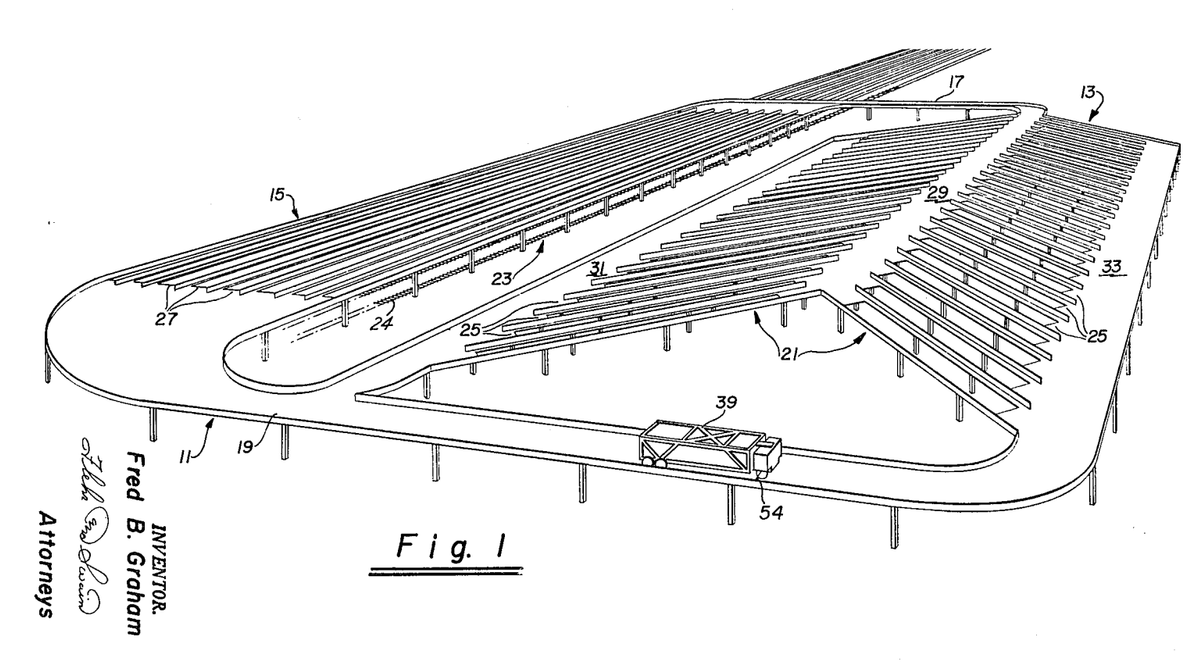
FIGURE 1 is a perspective view of a transfer system in accordance with this invention for transferring containers from trucks to railroad cars.

A system embodying the invention is shown in FIGURE 1, and comprises a trestle network 11 including the portions 13 and 15. The portions 13 and 15 are connected together by short transfer-ways 17 and 19. The portion 13 of the trestle network physically overlies a parking or terminal area 21 for one type of transportation vehicle trucks, while the portion 15 physically overlies a terminal area 23 for another type of transportation vehicle, railroad cars movable on the tracks, 24. Each of the portions 13 and 15 of the trestle network comprise a series of alternate paths or lanes 25 and 27 respectively. The actual transfer operation, as will be explained hereinafter, is performed in these various lanes.

In the embodiment shown in FIGURE 1, the lanes 25 are arranged in a herringbone pattern. That is the lanes are divided into two distinct groups of parallel lanes with each group facing the other at an angle. A central throughway 29 is provided at the junctions of the two groups of lanes and outer throughways 31 and 33 at their peripheries. The transfer-way 19 provides access to both outer throughways 31 and 33.

The lanes 27 in the portion 15 of the trestle network are arranged in a parallel manner, the transfer-ways 17 and 19 providing access to and exit from each of the lanes 27.

Figure 4:
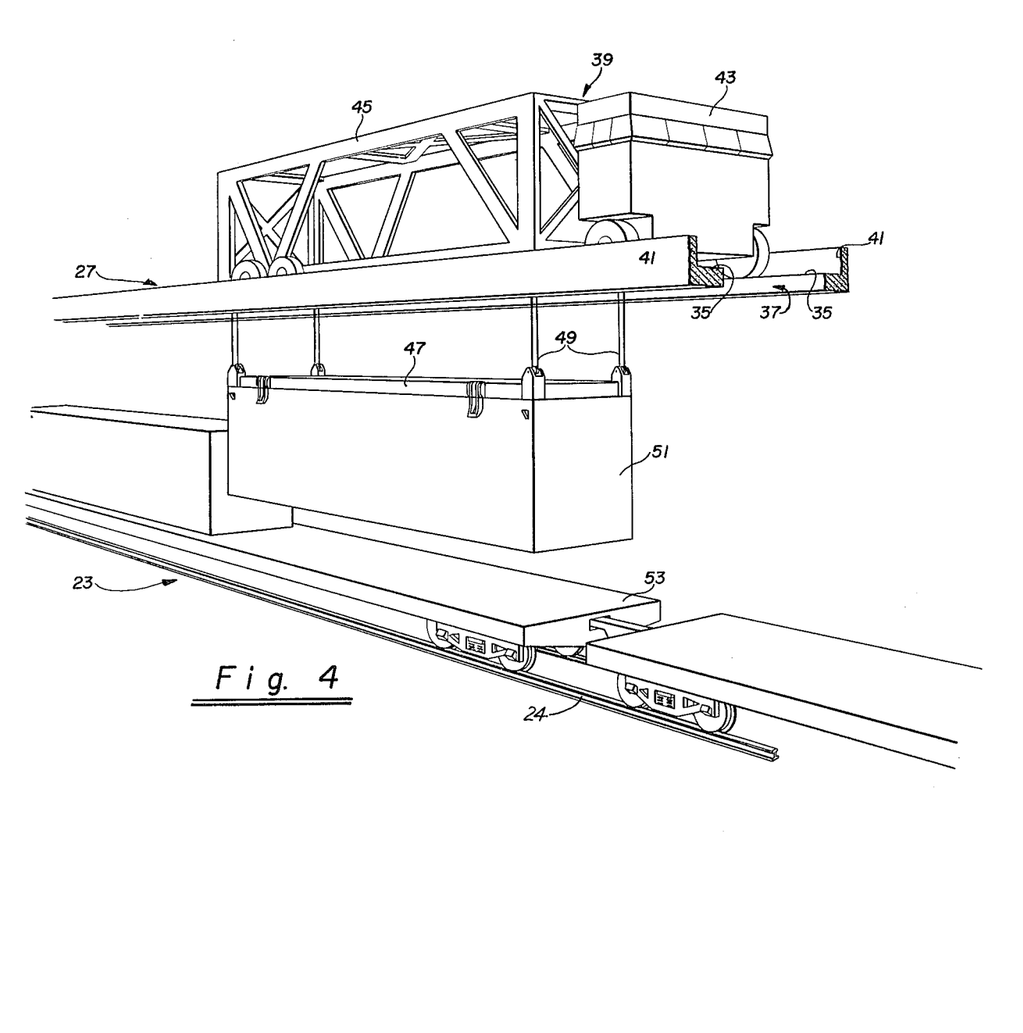
FIGURE 4 is a perspective view showing a transfer vehicle in the operation of lowering a container from a transfer lane to a railroad car therebelow.

The structure of the trestle network in the transfer areas can be more easily understood by reference to FIGURE 4, where a single lane 27 is shown disposed above a track 24 of the railroad terminal area 23. The lane 27 includes a pair of tracks or floor portions 35 which together form an opening 37. The tracks 35 are spaced to cooperate with the wheels of a transfer vehicle 39. Upright flanges 41 are provided in conjunction with the tracks 35 to serve as steering guides or as barricades depending upon the type of transfer vehicle employed.

While the transfer vehicle 39 is essential to the present system, the invention is in no way limited to specific details of the particular vehicle illustrated in FIGURE 4. This vehicle, which is particularly described in applicant's co-pending application entitled "Transfer Vehicle," Serial No. 62,760, filed October 14, 1960, comprises a tractor portion 43 and a trailer portion 45. The trailer portion includes a lifting frame 47 which is suspended and operated by cables 49 to grasp, and to either lift or lower, a container 51 with respect to a railway flatcar 53, on the track 24.

The transfer vehicle 39 is capable of grasping a container which is well below its own level and raising the container into the body of the trailer 45 itself. Thereafter the vehicle travels under its own power along the trestle network 11 (FIGURE 1) past the large openings in lanes 27 and like openings in the lanes 25. While guidance of the vehicle in these paths may be problematical, the problem can be solved in several ways. For example, the illustrated transfer vehicle is constructed so that the rear wheels (the trailer wheels) track the forward wheels (the tractor wheels). Thus movement along the narrow tracks is feasible even without wheel retaining means, such as flanges, on the wheels themselves. Such a vehicle may be utilized not only on the particular trestle network 11, but also along the open road.

Figure 3:
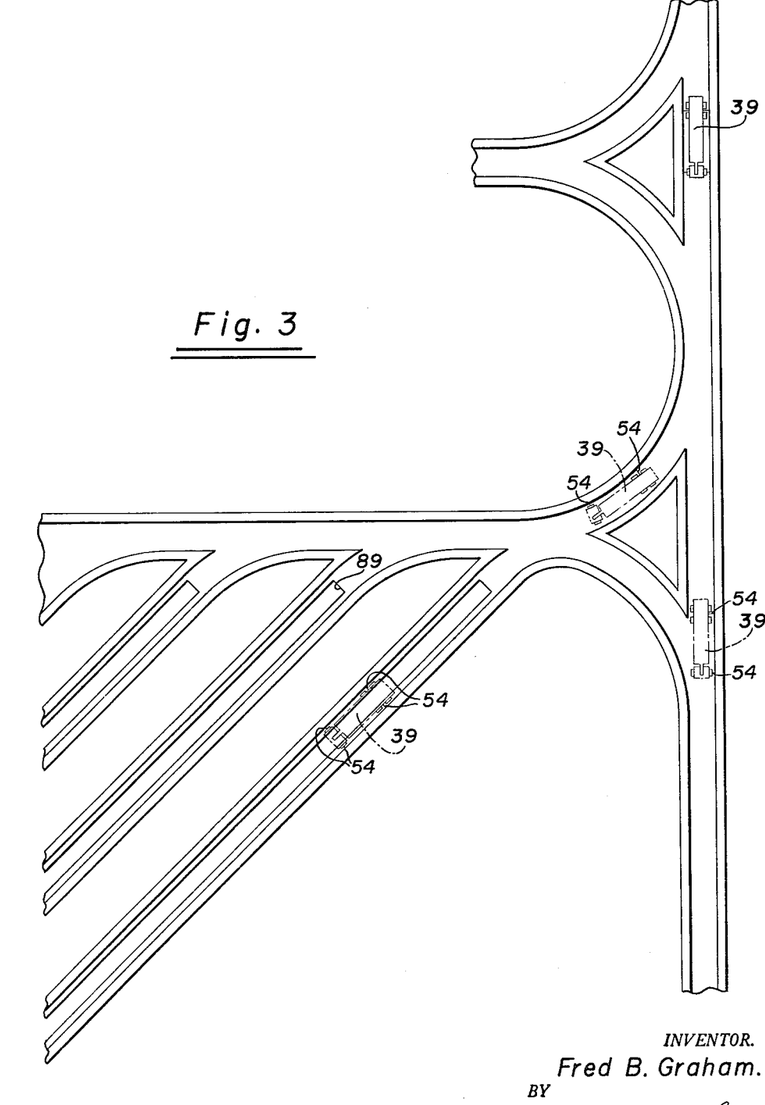
FIGURE 3 is a detailed view of a portion of FIGURE 2 showing a plurality of vehicles which may be utilized to transfer containers from one medium to another.

The vehicle may further include sensing means as shown schematically at 54 in FIGURES 1 and 3 and described in more complete detail in the above mentioned patent application, Serial No. 62,760.

Referring again to FIGURE 1 it should be realized that trucks which are to deliver or receive containers may travel through the terminal area 21. The traffic pattern, that is, the path of truck traffic through this area is similar to that of the trestle network portion 13 directly thereabove. Thus traffic congestion due to the loading or unloading of an individual truck is alleviated since any of the multiple lanes may be used. Free movement of individual railroad trains is similarly accomplished by the several parallel tracks 24 disposed below the lanes 27.

Thus a large number of transfer operations between the various modes of transportation, can be accomplished simultaneously with the employment of several transfer vehicles 39. A large number of trucks may be parked in the areas 21 below the openings 37 in the trestle network lanes 25. Several transfer vehicles 39 may be employed on the trestle network 11. After parking over the desired truck or railroad car, a transfer vehicle 39 serves to grasp the container held thereon and lift it into its own body. The transfer vehicle is then driven, along the lanes, throughways and transfer-ways to a position directly over a preselected railway car. The container is then lowered onto the car. Traffic congestion is held to a minimum since a large number of lanes 25 and 27 are provided to establish a series of multiple but interconnected traffic loops including the trestle network portions 13 and 15. The stoppage of an individual transfer vehicle 39 in any one of the lanes 25 or 27 does not hamper the traffic flow of other vehicles over any other lanes. Thus there is no waiting for other vehicles which have stopped to load or unload.

Figure 2:
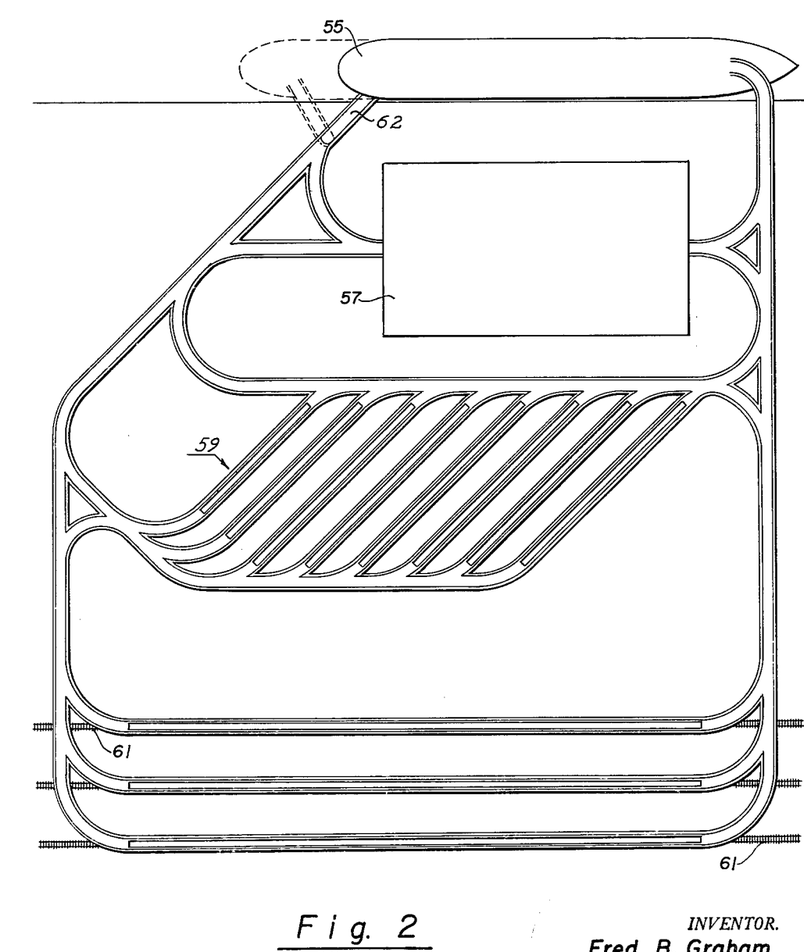
FIGURE 2 is a schematic plan view of a system in accordance with this invention wherein transfer is accomplished between the four media of ship, warehouse, truck and railroad.

Referring to FIGURES 2 and 3, another embodiment of the invention is shown. In this embodiment it is noted that three transportation media are included; rail, trucking and shipping. There is also shown a terminal warehouse which may be optionally provided. The system shown in FIGURE 2 is not meant to be a practical embodiment of the invention due to the large area of land it would require. However, the figure does amply show the versatile nature of the system in general. In this embodiment, transfer vehicles 39 may be utilized to convey freight containers from either the ship 55, warehouse 57, truck parking area 59, or railroad cars disposed on the tracks 61. The ship 55 should be of a type which permits the transfer vehicles to drive onto one end and off the other. The containers may be delivered to the hold from transfer vehicles on the weather deck. One of the pathways 62 leading to the ship 55 may be movable, as shown in dashed lines, to accommodate various size vessels. Thus the through traffic nature of the system is preserved. A ship of this type is disclosed in applicants copending application entitled "Cargo Ship," Serial No. 62,679, filed October 14, 1960.

Separate transfers may be made between any of the various media simultaneously. Thus one transfer vehicle may serve to unload the ship 55 into the warehouse 57 while another vehicle serves to transfer containers from the warehouse 57 onto trucks in the area 59. Still other transfer vehicles may be utilized to transfer goods from the warehouse 57 onto railroad cars. Due to the multiple loop arrangement of the present invention, wherein movement of the transfer vehicles is by a through traffic pattern rather than a reversible or straight line traffice pattern such multiple use of the trestle network does not create a traffic problem.

Referring more particularly to FIGURE 3, it is noted that since the vehicles 39 have their own independent steering and guidance system, that they may each travel various paths along the trestle network without complicated switching arrangements on the trestle network itself. It is also noted in FIGURES 2 and 3 that the various intersections do not cross but merely merge to provide free traffic flow of the transfer vehicles.

Figure 5:
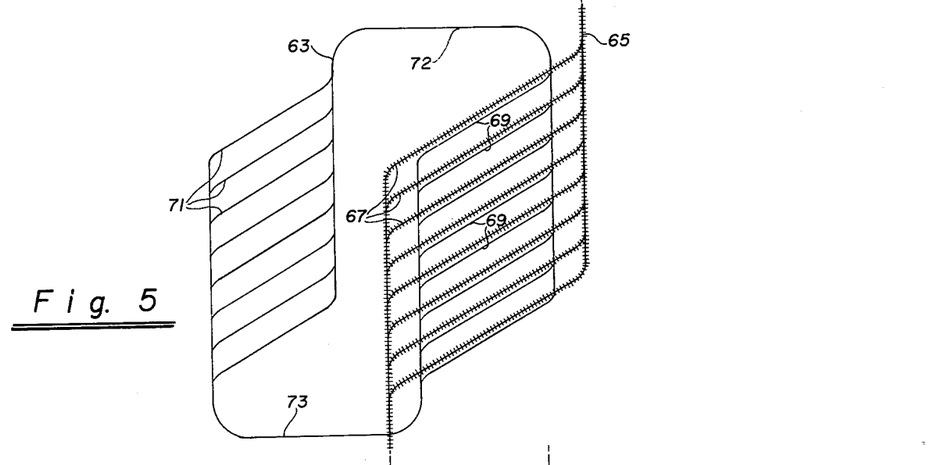
FIGURE 5 is a schematic plan view of another embodiment of the system is accordance with this invention.

Referring to FIGURE 5, a more simplified embodiment of the present invention is shown in schematic form. Here the lines 63 indicate the paths of the transfer vehicles 39 of FIGURES 1 and 4. The cross hatched lines 65 indicate the paths of the railroad cars. Thus it is seen that a plurality of paths of the railroad cars 67 are coextensive with a plurality of paths 69 of the transfer vehicles. Opposite the paths 69, other transfer vehicle paths 71 are disposed over a truck terminal area. It is noted that such an embodiment is extremely simple in form and provides all of the elements of the invention. Notably, there are multiple loops for the travel of the transfer vehicles which include many alternate paths in that portion of the system wherein transfer operations actually occur. Moreover, the transfer-ways 72 and 73 connecting the separate transfer vehicle paths are relatively short to reduce travel time between truck and rail terminals. Again the intersections are at acute angles and are of the merging rather than the crossing variety.

Figure 6:
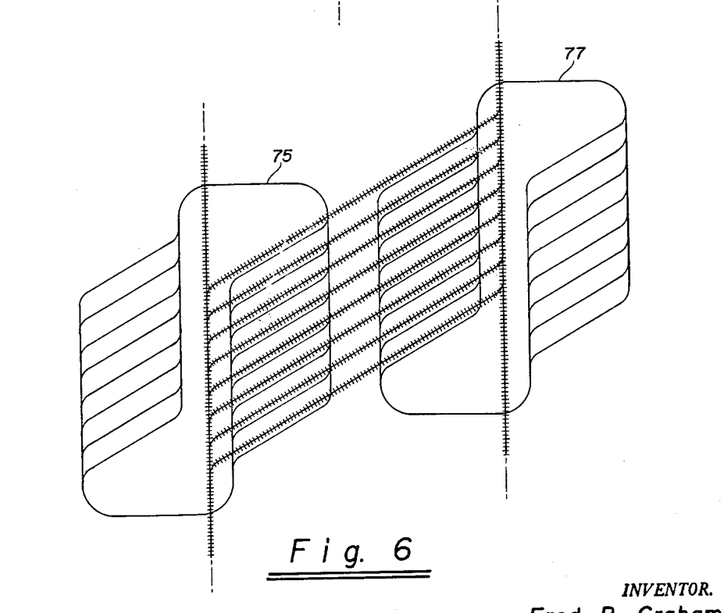
FIGURE 6 is a schematic plan view of still another embodiment of the system in accordance with this invention.

FIGURE 6 shows still another embodiment of the invention. In this instance there are two separate loops 75 and 77 each being similar to the transfer vehicle loop of FIGURE 5. It is noted that the embodiment of FIGURE 6 is merely a multiple of the embodiment shown in FIGURE 5. Such multiplication rather than being two fold as shown in FIGURE 6 may include any number of transfer loops such as 75 and 77. It should be realized that where large transfer systems are employed, travel time between the various areas, such as for loading and unloading trucks and railroad cars, must be relatively short. If the system becomes exceedingly large, its economy may be reduced to some degree by extensive vehicle travel time over long paths. Thus the multiple system as shown in FIGURE 6 has considerable utility in such large systems. Although they are not shown, it is obvious that the various transfer loops 75 and 77 may in themselves be connected by additional transfer-ways to provide for an occasional transfer of vehicles from one group to another.

Figure 7:
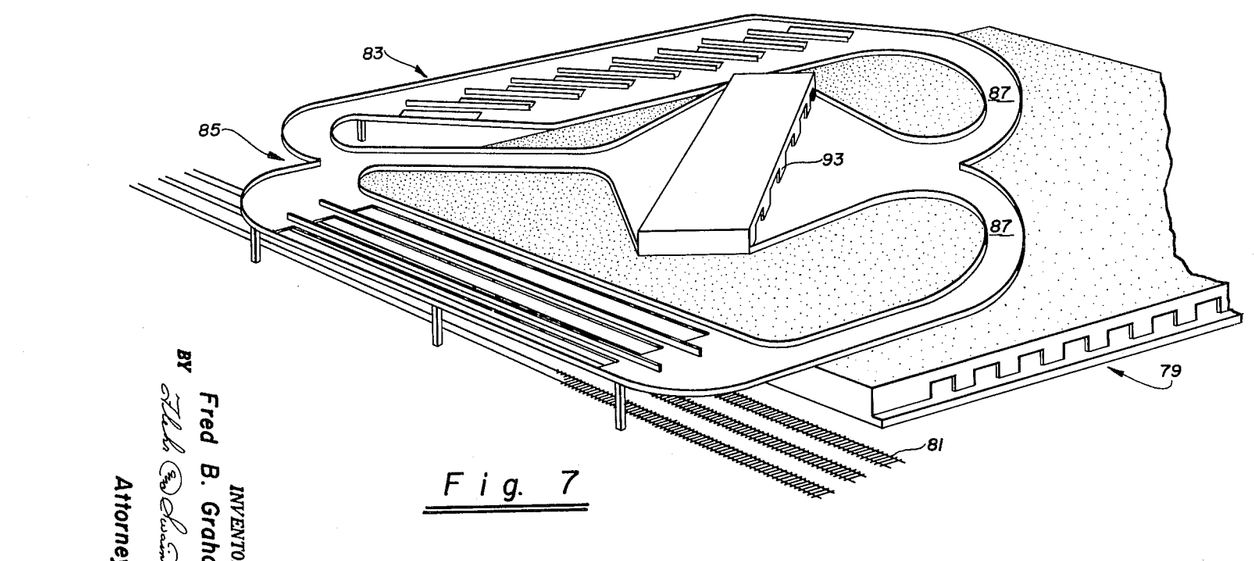
FIGURE 7 is a perspective view of a terminal or warehouse in accordance with this invention.
Figure 8:
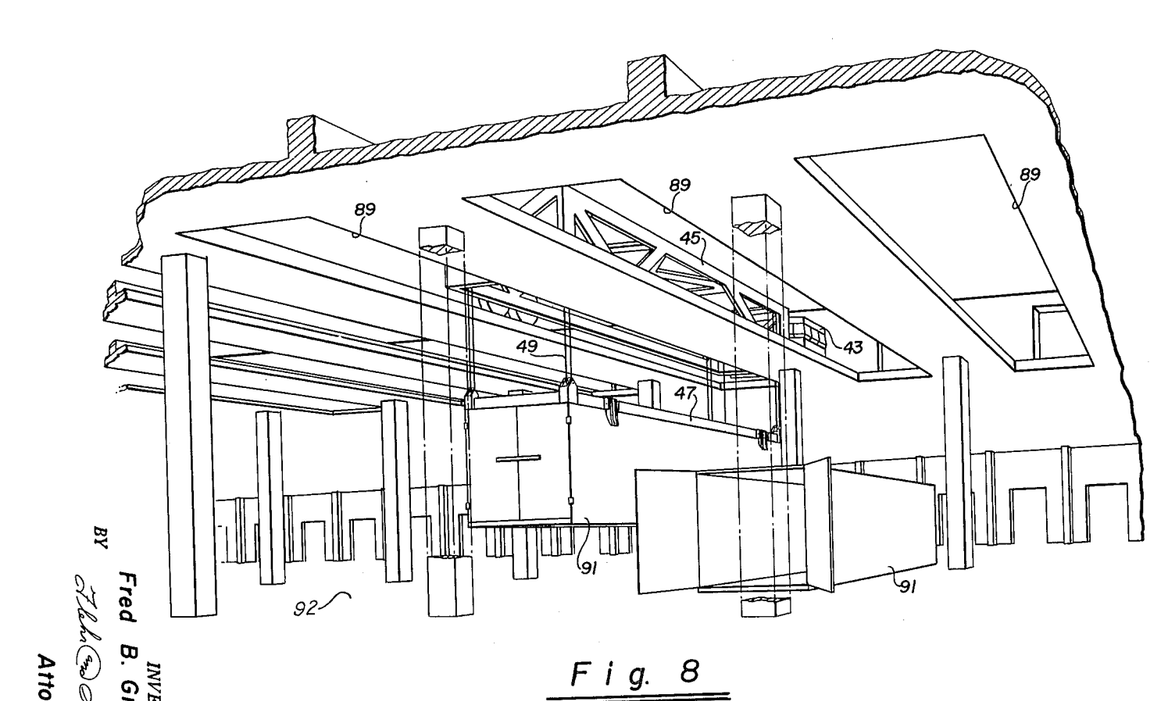
FIGURE 8 is a view of the interior of the warehouse shown in FIGURE 7.

Referring to FIGURES 7 and 8, a warehouse in accordance with the present invention is shown. The warehouse includes a main terminal 79 which is located along railroad tracks 81. A truck terminal area 83 is also included. Thus transfer may take place between the warehouse, railway cars, and the trucking simultaneously.

In the embodiment shown in FIGURES 7 and 8, the transfer vehicles not only travel on a trestle network 85 but also along paths 87 on the roof of the warehouse itself. The roof may be pierced as at 89 (FIGURE 8) for passage of the containers 91 to and from the storage floor 92. The pierced portion of the roof may be covered as at 93 to provide protection against the elements.

The warehouse may be employed to load and unload the individual containers themselves and may also be used as a center for redistributing the contents of the containers in smaller lots.

Thus it is seen that a new transport system is provided. The system employs means whereby freight may be packed in a large container which is itself the trailer section of a truck. The containers themselves serve merely as large boxes for carrying the freight and may be transported individually and separately from the truck itself. The system provides individual and independent transfer vehicles supported by an overhead trestle. The trestle interconnects various terminal areas which accommodate the various media of transportation and a warehouse. Furthermore the system includes a through traffic flow not only of the various transfer vehicles themselves, but also of trucks and railroad cars which are to be serviced. Through traffic flow is facilitated by the use of multiple loop paths having a series of alternate lanes in the areas where loading and unloading operations occur.

While the specific embodiments shown in the specification relate to particular media of transportation, it is understood that any media may be utilized and be within the scope of the invention.

I claim:

1. A system for transferring cargo in large containers comprising a trestle network having a plurality of portions, each of said portions comprising a plurality of separate lanes, a first transfer-way interconnecting one end of all the lanes of both portions, a second transfer-way interconnecting the other ends of all said lanes to form a plurality of complete and interconnected loops on said trestle network, one of the portions of said network being disposed above one terminal area and another of the portions of said network being disposed above another terminal area, and a transfer vehicle disposed to travel on said trestle network, said transfer vehicle being adapted to receive and deliver containers from and to one of said terminal areas below the trestle network when the transfer vehicle is in one of said lanes.

2. A system for transferring cargo in large containers comprising a trestle network having a plurality of portions, each of said portions comprising a plurality of separate lanes, said lanes including a pair of spaced tracks defining an opening, a first transfer-way interconnecting one end of all the lanes of both portions, a second transfer-way interconnecting the other ends of all said lanes to form a plurality of complete and interconnected loops on said trestle network, one of the portions of said network being disposed above one terminal area and another of the portions of said network being disposed above another terminal area, and a transfer vehicle disposed to travel over the tracks of said lanes and to deliver said containers through said opening.

3. A system for transferring cargo in large containers comprising a trestle network having a plurality of portions, each of said portions comprising a plurality of separate lanes, said lanes including a pair of spaced tracks defining an opening, a first transfer-way interconnecting one end of all the lanes of both portions, a second transfer-way interconnecting the other ends of all said lanes to form a plurality of complete and interconnected loops on said trestle network, one of the portions of said network being disposed above one terminal area and another of the portions of said network being disposed above another terminal area, a transfer vehicle adapted to travel on said trestle network and to deliver said containers through said opening, guidance means in said lanes for preventing said transfer vehicle from falling through said opening, said guidance means including a prelocated upright flange along said lanes, sensor means on said transfer vehicle for determining the proximity of said transfer vehicle to said flange, and means responsive to said determination for steering said vehicle.

4. A system for transferring freight containers from truck trailers to the beds of railway cars and vice versa, comprising a railroad terminal area and a truck terminal area, a trestle network including a first and a second portion, said first portion being disposed above said railroad terminal, said second portion being disposed above said truck terminal, each of said portions including a plurality of lanes arranged in a parallel relationship, said trestle network further including a first and a second transfer-way, one of said transfer-ways connecting one end of each said lanes in one portion with one end of each said lanes in the other portion, the other of said transfer-ways connecting the other end of said lanes in last portions, each of said lanes including a pair of spaced tracks defining an opening, a transfer vehicle disposed to travel over said tracks and on said transfer-ways, said transfer vehicle being adapted to receive and deliver containers through said opening when in one of said lanes.

5. In a transfer system, a terminal structure comprising a trestle network divided into a plurality of portions, an area below said portions for receiving containers, each of said portions including a plurality of parallel lanes, each of said parallel lanes defining an opening therethrough, one end of the lanes in one portion being interconnected by a transfer-way to one end of the lanes in another portion, the other end of the lanes in both portions being interconnected by another transfer-way, said portions and transfer-ways forming a complete traffic loop, and transfer vehicle means for traveling on said trestle network and for delivering containers through said openings to and from cars below the different portions of the terminal structure.

6. In a transfer system, a terminal structure as defined in claim 5 wherein said lanes include a pair of spaced tracks defining an opening therebetween.

7. In a transfer system, a terminal structure as defined in claim 5 together with a dock adapted to berth a vessel, and auxiliary pathways extending from said transfer-ways into opposite ends of said dock whereby a complete pathway is established through said vessel after berthing.

8. A transfer system as defined in claim 7 wherein that end remote from the transfer-way of at least one of said auxiliary pathways is movable toward and away from the corresponding end of another of said auxiliary pathways whereby vessels of various size may be accommodated.

9. In a transfer system, a terminal warehouse comprising a storage floor and a roof, said roof being pierced to form openings therein, vehicle pathways across said roof, said pathways including that portion of the roof over the openings therein, means connected ot said pathways at opposite ends thereof to form a complete loop path and a transfer vehicle adapted to travel along said pathways and to deliver containers through said openings.

10. A transfer system comprising a first area for parking freight transportation vehicles, said vehicles being adapted to carry a removable transfer container, a second area, an overhead trestle overlying both of said areas, said trestle at the portions directly above said areas including a plurality of separate lanes arranged in a side by side manner, said lanes being adapted to support a transfer vehicle, each of said lanes including a pair of floor tracks which together define a floor opening, said opening being adapted for passing said container therethrough, said transportation vehicle disposed on said trestle and adapted to lift said container from said transportation vehicle through the opening in one of said lanes, to deliver the container to another lane and to lower the container through said other lane.

11. A transfer system comprising a first terminal area for a first transportation medium, a second terminal area for a second transportation medium, and a trestle network physically overlying both said terminal areas, said trestle network defining openings therethrough and being adapted to receive transfer vehicles for free movement on said network between each of said terminal areas, transfer vehicle means for delivering containers through said openings to and from said terminal areas, said trestle network including a plurality of lanes for said transfer vehicles, each of said lanes at each end thereof being in communication with a transfer-way whereby a plurality of individual but interconnected loops are formed on said trestle network.

12. A system for transferring freight comprising a trestle network having a first and a second group of traffic lanes, said groups of lanes being joined with transfer-ways to form a plurality of complete loops, each of said loops including one of said traffic lanes, each of said traffic lanes having a pierced floor section forming openings therein, each of said groups of traffic lanes being disposed over a terminal area, a transfer vehicle on said trestle network and adapted to travel thereabout, means on said transfer vehicle for grasping and lifting a freight container through one of said openings in a terminal area below said trestle network and for lowering said container through one of said openings at a location below another part of the trestle network.

References Cited in the file of this patent

UNITED STATES PATENTS

| | | |
|---|---|---|
| Re. 22,082 | Duncan | Apr. 18, 1942 |
| 1,107,378 | Fitcomb | Aug. 18, 1914 |
| 1,798,581 | Bentley | Mar. 31, 1931 |
| 1,860,747 | McLaughlin | May 31, 1932 |
| 2,051,678 | Bywater | Apr. 18, 1936 |
| 2,166,948 | Fitch | July 25, 1939 |